(12) United States Patent
Hwang et al.

(10) Patent No.: US 7,957,499 B2
(45) Date of Patent: Jun. 7, 2011

(54) APPARATUS AND METHOD FOR COMPENSATING TIMING OFFSET IN BROADBAND WIRELESS COMMUNICATION SYSTEM

(75) Inventors: Ki-Hwan Hwang, Seoul (KR);
Kyun-Byoung Ko, Hwaseong-si (KR);
Ji-Ho Jang, Yongin-si (KR);
Sung-Kwon Jo, Suwon-si (KR);
Jae-Hyok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 785 days.

(21) Appl. No.: 11/998,264

(22) Filed: Nov. 29, 2007

(65) Prior Publication Data

US 2008/0130813 A1 Jun. 5, 2008

(30) Foreign Application Priority Data

Nov. 30, 2006 (KR) .................. 10-2006-0119730

(51) Int. Cl.
*H04L 7/00* (2006.01)
(52) U.S. Cl. .................. 375/371; 375/260; 375/354
(58) Field of Classification Search .................. 375/371, 375/344
See application file for complete search history.

(56) References Cited

U.S. PATENT DOCUMENTS

| | | | | |
|---|---|---|---|---|
| 5,867,528 A * | 2/1999 | Verbueken | .................. | 375/222 |
| 6,359,938 B1 * | 3/2002 | Keevill et al. | .................. | 375/316 |
| 6,396,884 B1 * | 5/2002 | Maruyama | .................. | 375/344 |
| 6,650,718 B1 * | 11/2003 | Fujimura et al. | .................. | 375/355 |
| 6,853,616 B1 * | 2/2005 | Kim et al. | .................. | 370/210 |
| 6,928,120 B1 * | 8/2005 | Zhang | .................. | 375/260 |
| 6,947,530 B1 * | 9/2005 | Barsoum | .................. | 379/93.08 |
| 6,987,754 B2 * | 1/2006 | Shahar et al. | .................. | 370/349 |
| 7,088,787 B2 * | 8/2006 | Wang et al. | .................. | 375/316 |
| 7,436,759 B2 * | 10/2008 | Hayashi et al. | .................. | 370/208 |
| 7,515,875 B2 * | 4/2009 | Horisaki | .................. | 455/59 |
| 7,668,246 B2 * | 2/2010 | Zhidkov et al. | .................. | 375/260 |
| 7,668,260 B2 * | 2/2010 | Arambepola | .................. | 375/316 |
| 7,668,269 B2 * | 2/2010 | Ma et al. | .................. | 375/350 |
| 2003/0058966 A1 * | 3/2003 | Gilbert et al. | .................. | 375/326 |
| 2003/0142764 A1 * | 7/2003 | Keevill et al. | .................. | 375/341 |
| 2003/0152021 A1 * | 8/2003 | Wang et al. | .................. | 370/208 |
| 2004/0184551 A1 * | 9/2004 | Liu et al. | .................. | 375/260 |
| 2005/0078599 A1 * | 4/2005 | Zhidkov et al. | .................. | 370/210 |
| 2005/0084025 A1 * | 4/2005 | Chen | .................. | 375/260 |
| 2005/0238109 A1 * | 10/2005 | Koga et al. | .................. | 375/260 |
| 2007/0053470 A1 * | 3/2007 | Yousef et al. | .................. | 375/344 |
| 2009/0129489 A1 * | 5/2009 | Eldar et al. | .................. | 375/260 |

FOREIGN PATENT DOCUMENTS

KR 10-2001-0001706 1/2001
KR 10-2002-0094370 12/2002

* cited by examiner

*Primary Examiner* — Chieh M Fan
*Assistant Examiner* — Santiago Garcia (57) ABSTRACT

Provided is an apparatus and method for compensating a timing offset in a broadband wireless communication system. A receiving apparatus for the timing offset compensation includes a selector, a first calculator, and a second calculator. The selector groups two or more adjacent tiles into one or more tile groups and selects one or more pilot pairs, each including adjacent pilot signals, from each tile group. The first calculator calculates an average phase difference between the pilot pairs. The second calculator calculates a timing offset using the average phase difference.

18 Claims, 7 Drawing Sheets

APPARATUS AND METHOD FOR COMPENSATING TIMING OFFSET IN BROADBAND WIRELESS COMMUNICATION SYSTEM

CROSS-REFERENCE TO RELATED APPLICATION(S) AND CLAIM OF PRIORITY

This application claims priority under 35 U.S.C. §119 to an application filed in the Korean Intellectual Property Office on Nov. 30, 2006 and allocated Serial No. 2006-119730, the contents of which are incorporated herein by reference.

TECHNICAL FIELD OF THE INVENTION

The present invention relates generally to a broadband wireless communication system, and in particular, to an apparatus and method for estimating and compensating a timing offset in a broadband wireless communication system.

BACKGROUND OF THE INVENTION

Extensive research is being conducted to provide various Quality of Service (QoS) features with a data rate of about 100 Mbps in the advanced fourth-generation (4G) communication system. The 4G communication system is evolving to provide mobility, high data rate transmission, and high QoS in a broadband wireless access (BWA) communication system such as a Local Area Network (LAN) system and a Metropolitan Area Network (MAN) system. A typical example of the above system is identified in the Institute of Electrical and Electronics Engineers (IEEE) 802.16 communication system.

The IEEE 802.16 communication system uses an orthogonal frequency division multiplexing (OFDM) or orthogonal frequency division multiple access (OFDMA) scheme in order to support a broadband transmission network in a physical channel of the wireless communication system.

In an OFDM/OFDMA communication system, one OFDM symbol received at a base station is the sum of signals of user terminals (or mobile stations). Thus, there is a timing offset that is a time error between signals for each subcarrier in one OFDM symbol. The timing offset occurs when the timing of each user terminal is inaccurately controlled in a ranging process or when the controlled timing of each user terminal changes slightly due to the movement of the user terminal. Thus, the phase of a signal for each subcarrier changes linearly. Therefore, the timing offset can be estimated by detecting the phase change of pilot signals in the same OFDM symbol.

Figure 1:
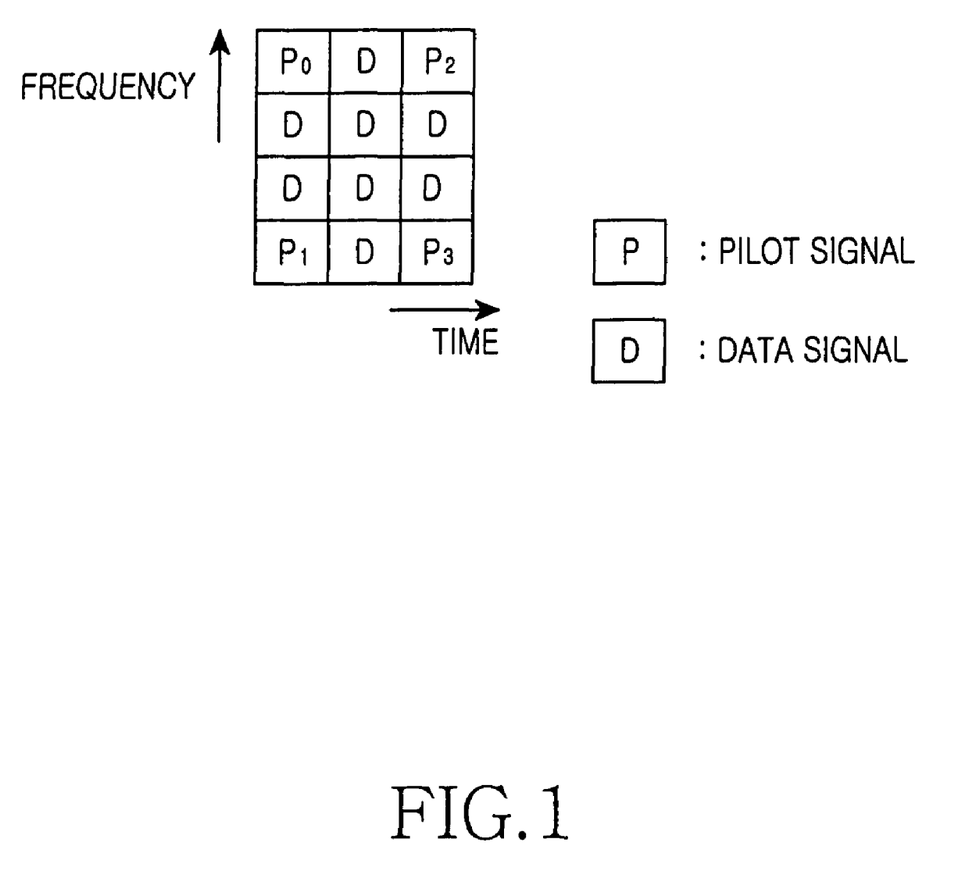
FIG. 1 is a diagram illustrating the distribution of pilot tones in a broadband wireless communication system.

FIG. 1 is a diagram illustrating the distribution of pilot signals of an uplink single input, single output (SISO) Partial Usage of SubChannels (PUSC) subchannel in the IEEE 802.16 communication system. The structure of a tile is illustrated in FIG. 1. Referring to FIG. 1, four (4) frequency tones and three (3) OFDM symbols constitute one tile including four (4) pilot signals. Thus, in the uplink SISO PUSC subchannel, the timing offset can be estimated and compensated on a tile-by-tile basis by the use of pairs of pilot signals (e.g., P0 and P1) that are paired in each OFDM symbol.

Hereinafter, a description is given of a process for estimating the timing offset by using the pilot signals. First, the relationship between a pair of pilot signals in each OFDM symbol can be expressed as Equation 1:

$$P_1 = P_0 \exp(j2\pi \cdot k \cdot t_s \cdot 3\Delta f), \left( t_s = \frac{1}{F_s}, \Delta f = \frac{F_s}{N_{FFT}} \right). \quad [\text{Eqn. 1}]$$

In Equation 1, k denotes a timing offset, $t_s$ denotes a sampling time interval, $F_s$ denotes a sampling period, $\Delta f$ denotes a subcarrier interval, and NFFT denotes an Fast Fourier Transform (FFT) size (i.e., the total subcarrier number). Herein, noise components are excluded.

For estimation of the timing offset, Equation 1 can be transformed into Equation (2):

$$P_0^* P_1 = |P_0|^2 \exp\left( j2\pi \cdot \frac{3k}{N_{FFT}} \right). \quad [\text{Eqn. 2}]$$

In Equation 2, k denotes a timing offset and NFFT denotes an FFT size

Equation 2 can be rearranged for the timing offset k as Equation 3:

$$k = \frac{1}{2\pi} \cdot \frac{N_{FFT}}{3} \cdot \tan^{-1}\left( \frac{\text{Im}(P_0^* P_1)}{\text{Re}(P_0^* P_1)} \right). \quad [\text{Eqn. 3}]$$

In Equation 3, NFFT denotes an FFT size, Im( ) denotes an imaginary component, and Re( ) denotes a real component.

One uplink PUSC slot (i.e., the minimum resource allocation unit) includes six (6) tiles. Thus, for reduction of a noise effect, a timing offset can be calculated by accumulating the conjugate products of pilot pairs for each tile in every slot of a burst received from a user terminal, as Equation 4:

$$k = \frac{1}{2\pi} \cdot \frac{N_{FFT}}{3} \cdot \tan^{-1}\left( \frac{\text{Im}\left[ \sum_{N_{slot}} \sum_{N_{tile}} (P_0^* P_1 + P_2^* P_3) \right]}{\text{Re}\left[ \sum_{N_{slot}} \sum_{N_{tile}} (P_0^* P_1 + P_2^* P_3) \right]} \right). \quad [\text{Eqn. 4}]$$

In Equation 4, NFFT denotes an FFT size, Im( ) denotes an imaginary component, Re( ) denotes a real component, Nslot denotes the total slot number, and Ntile denotes the total tile number.

Figure 2A:
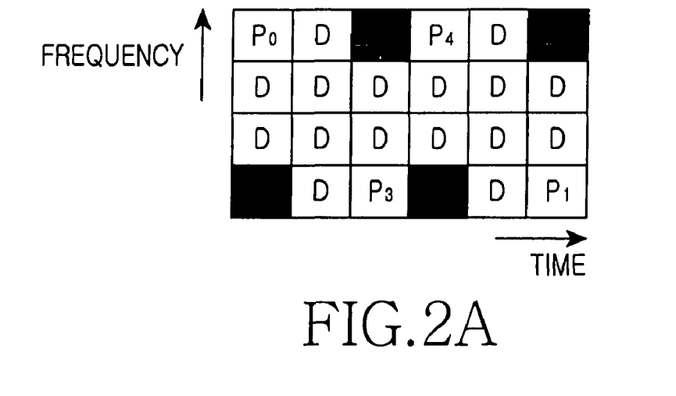
FIGS. 2A and 2B are diagrams illustrating the distribution of pilot tones for multiple antennas in the broadband wireless communication system.
Figure 2B:
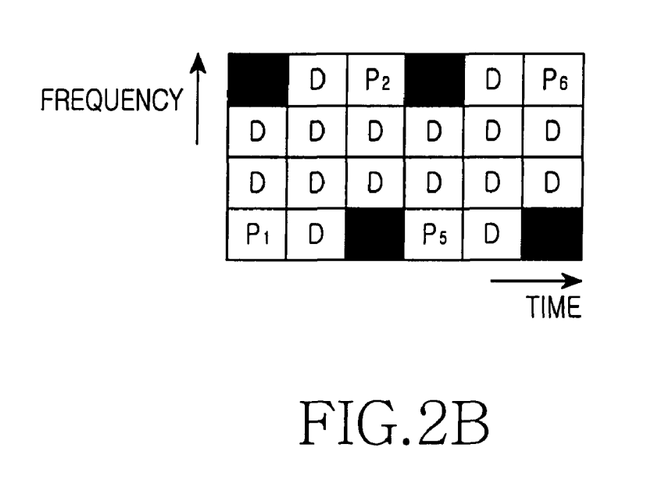

However, in the case of multiple input, multiple output (MIMO) environments not the SISO environments, antennas use pilot signals in a distributive manner as illustrated in FIGS. 2A and 2B. That is, if there are two antennas, pilot signals, which are present in one pair on each of the time and frequency axes as illustrated in FIG. 1, are distributed to each antenna as illustrated in FIGS. 2A and 2B. In this case, there are no adjacent pilot signals on the same OFDM symbol in the tile, making it impossible to estimate a timing offset in the above-described manner.

SUMMARY OF THE INVENTION

To address the above-discussed deficiencies of the prior art, it is a primary object of the present invention to substantially solve at least the above problems and/or disadvantages and to provide at least the advantages below. Accordingly, an object of the present invention is to provide an apparatus and method for estimating a timing offset by the use of pilot signals and compensating the timing offset of a data signal in a broadband wireless communication system.

Another object of the present invention is to provide an apparatus and method for estimating and compensating a timing offset in a broadband wireless communication system if pilot signals in a tile are not adjacent on the frequency axis.

Still another object of the present invention is to provide an apparatus and method for estimating and compensating a timing offset in a broadband wireless communication system by the use of a plurality of adjacent tiles if pilot signals in one tile are not adjacent on the frequency axis.

According to one aspect of the present invention, a receiving apparatus for a broadband wireless communication system includes: a selector for grouping two or more adjacent tiles into one or more tile groups and selecting one or more pilot pairs, each including adjacent pilot signals, from each tile group; a first calculator for calculating an average phase difference between the pilot pairs; and a second calculator for calculating a timing offset using the average phase difference.

According to another aspect of the present invention, a method for compensating a timing offset in a broadband wireless communication system includes the steps of: grouping two or more adjacent tiles into one or more tile groups and selecting one or more pilot pairs, each including adjacent pilot signals, from each tile group; calculating an average phase difference between the pilot pairs; and calculating a timing offset using the average phase difference.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2A through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Preferred embodiments of the present invention will be described herein below with reference to the accompanying drawings. In the following description, well-known functions or constructions are not described in detail since they would obscure the invention in unnecessary detail.

The present invention is intended to provide an apparatus and method for estimating and compensating a timing offset in a broadband wireless communication system by using at least two tiles. The following description is made in the context of an OFDM wireless communication system, to which the present invention is not limited. Thus, it is to be clearly understood that the present invention is applicable to any other multi-carrier wireless communication system.

First, a description is given of a mathematical basis for estimating a timing offset according to the present invention.

In the tile structure illustrated in FIGS. 2A and 2B, the relationship between pilot signals can be expressed as Equation 5:

$$P_4 = P_3 \exp(j2\pi \cdot f_{offset}^A \cdot T_s) \exp\left(j2\pi \cdot \frac{3k_A}{N_{FFT}}\right) \quad [\text{Eqn. 5}]$$

$$P_0 = P_3 \exp(j2\pi \cdot f_{offset}^A \cdot -2T_s) \exp\left(j2\pi \cdot \frac{3k_A}{N_{FFT}}\right)$$

$$P_4 = P_7 \exp(j2\pi \cdot f_{offset}^A \cdot -2T_s) \exp\left(j2\pi \cdot \frac{3k_A}{N_{FFT}}\right)$$

$$P_2 = P_5 \exp(j2\pi \cdot f_{offset}^B \cdot -T_s) \exp\left(j2\pi \cdot \frac{3k_B}{N_{FFT}}\right)$$

$$P_2 = P_1 \exp(j2\pi \cdot f_{offset}^B \cdot 2T_s) \exp\left(j2\pi \cdot \frac{3k_B}{N_{FFT}}\right)$$

$$P_6 = P_5 \exp(j2\pi \cdot f_{offset}^B \cdot 2T_s) \exp\left(j2\pi \cdot \frac{3k_B}{N_{FFT}}\right).$$

In Equation 5, $f_{offset}^A$ denotes a frequency offset of a pattern A (see FIG. 2A), $f_{offset}^B$ denotes a frequency offset of a pattern B (see FIG. 2B), $T_s$ denotes an OFDM symbol time, $k_A$ denotes a timing offset of the pattern A, $k_B$ denotes a timing offset of the pattern B, and $N_{FFT}$ denotes an FFT size.

For estimation of the timing offset, Equation 5 can be transformed into Equation 6:

$$P_3^* P_4 = |P_3|^2 \exp(j2\pi \cdot f_{offset}^A \cdot T_s) \exp\left(j2\pi \cdot \frac{3k_A}{N_{FFT}}\right) \quad [\text{Eqn. 6}]$$

$$P_3^* P_0 = |P_3|^2 \exp(j2\pi \cdot f_{offset}^A \cdot -2T_s) \exp\left(j2\pi \cdot \frac{3k_A}{N_{FFT}}\right)$$

$$P_7^* P_4 = |P_7|^2 \exp(j2\pi \cdot f_{offset}^A \cdot -2T_s) \exp\left(j2\pi \cdot \frac{3k_A}{N_{FFT}}\right)$$

-continued $$P_5^*P_2 = |P_5|^2 \exp(j2\pi \cdot f_{offset}^B \cdot -T_s)\exp\left(j2\pi \cdot \frac{3k_B}{N_{FFT}}\right)$$

$$P_1^*P_2 = |P_1|^2 \exp(j2\pi \cdot f_{offset}^B \cdot 2T_s)\exp\left(j2\pi \cdot \frac{3k_B}{N_{FFT}}\right)$$

$$P_5^*P_6 = |P_5|^2 \exp(j2\pi \cdot f_{offset}^B \cdot 2T_s)\exp\left(j2\pi \cdot \frac{3k_B}{N_{FFT}}\right).$$

In Equation 6, $f_{offset}^A$ denotes a frequency offset of a pattern A (see FIG. 2A), $f_{offset}^B$ denotes a frequency offset of a pattern B (see FIG. 2B), $T_s$ denotes an OFDM symbol time, $k_A$ denotes a timing offset of the pattern A, $k_B$ denotes a timing offset of the pattern B, and $N_{FFT}$ denotes an FFT size.

Equation 6 can be rearranged for $k_A$, $f_{offset}^A$, $k_B$, and $f_{offset}^B$ as Equation 7:

$$k_A + \frac{T_S N_{FFT}}{3} f_{offset}^A = \qquad [\text{Eqn. 7}]$$

$$\frac{1}{2\pi} \cdot \frac{N_{FFT}}{3} \cdot \tan^{-1}\left(\frac{\text{Im}\left[\sum_{N_{slot-pair}} \sum_{N_{tile}} (P_3^*P_4)\right]}{\text{Re}\left[\sum_{N_{slot-pair}} \sum_{N_{tile}} (P_3^*P_4)\right]}\right)$$

$$k_A - \frac{2T_S N_{FFT}}{3} f_{offset}^A = \frac{1}{2\pi} \cdot \frac{N_{FFT}}{3} \cdot \tan^{-1}\left(\frac{\text{Im}\left[\sum_{N_{slot}} \sum_{N_{tile}} (P_3^*P_0)\right]}{\text{Re}\left[\sum_{N_{slot}} \sum_{N_{tile}} (P_3^*P_0)\right]}\right)$$

$$k_B - \frac{T_S N_{FFT}}{3} f_{offset}^B =$$

$$\frac{1}{2\pi} \cdot \frac{N_{FFT}}{3} \cdot \tan^{-1}\left(\frac{\text{Im}\left[\sum_{N_{slot-pair}} \sum_{N_{tile}} (P_5^*P_2)\right]}{\text{Re}\left[\sum_{N_{slot-pair}} \sum_{N_{tile}} (P_5^*P_2)\right]}\right)$$

$$k_B + \frac{2T_S N_{FFT}}{3} f_{offset}^B = \frac{1}{2\pi} \cdot \frac{N_{FFT}}{3} \cdot \tan^{-1}\left(\frac{\text{Im}\left[\sum_{N_{slot}} \sum_{N_{tile}} (P_1^*P_2)\right]}{\text{Re}\left[\sum_{N_{slot}} \sum_{N_{tile}} (P_1^*P_2)\right]}\right).$$

In Equation 7, $f_{offset}^A$ denotes a frequency offset of a pattern A, $f_{offset}^B$ denotes a frequency offset of a pattern B, $T_s$ denotes an OFDM symbol time, $k_A$ denotes a timing offset of the pattern A, $k_B$ denotes a timing offset of the pattern B, $N_{FFT}$ denotes an FFT size, Im( ) denotes an imaginary component, Re( ) denotes a real component, $N_{slot}$ denotes the total slot number, $N_{slot-pair}$ denotes the number of slot pairs consecutive on the time axis, and $N_{tile}$ denotes the total tile number.

The timing offsets $k_A$ and $k_B$ can be estimated using Equation 7. For example, there are two embodiments for the timing offset estimation, depending on the ways to process the frequency offsets $f_{offset}^A$ and $f_{offset}^B$. The first embodiment estimates and substitutes the frequency offset. That is, the first embodiment separately estimates the frequency offset and the timing offset. That is, the first embodiment estimates the frequency offset and then the timing offset. The second embodiment linearly adds two pairs of formulas in Equation 7 regarding the timing offsets for the respective patterns. By doing so, terms related to the frequency offsets are eliminated and the timing offsets can be estimated.

Hereinafter, the construction and operation of a base station for compensating a timing offset according to the present invention will be described in detail with reference to FIGS. 3 through 7.

Figure 3:
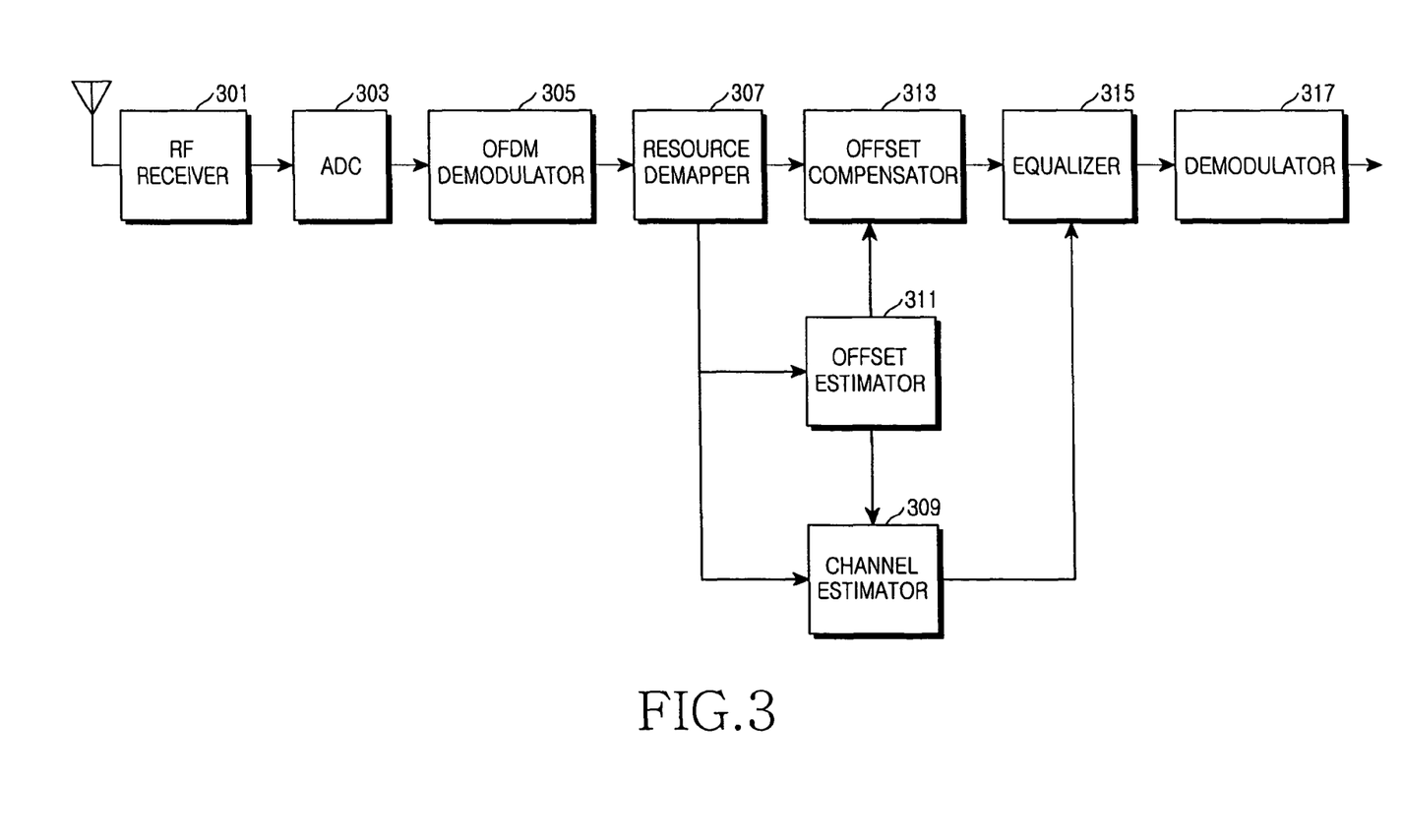
FIG. 3 is a block diagram of a base station in the broadband wireless communication system according to an embodiment of the present invention.

FIG. 3 is a block diagram of a base station in a broadband wireless communication system according to an embodiment of the present invention.

Referring to FIG. 3, the base station includes an antenna, a radio frequency (RF) receiver 301, an Analog-to-Digital Converter (ADC) 303, an OFDM demodulator 305, a resource demapper 307, a channel estimator 309, an offset estimator 311, an offset compensator 313, an equalizer 315, and a demodulator 317.

The RF receiver 301 converts an RF signal received through the antenna into a baseband analog signal. The ADC 303 converts the analog signal from the RF receiver 301 into a digital signal. The OFDM demodulator 305 FFT-processes the time-domain signal from the ADC 303 into a frequency-domain signal.

The resource demapper 307 demaps the frequency-domain signal from the OFDM demodulator 305, thereby outputting a data signal to the offset compensator 313 and outputting a pilot signal to the channel estimator 309 and the offset estimator 311.

The channel estimator 309 receives the pilot signal from the resource demapper 307 and estimates a channel of each subcarrier. At this point, the channel estimator 309 receives a timing offset value from the offset estimator 311 and estimates the channel on the basis of a timing offset of the pilot signal as well.

The offset estimator 311 receives the pilot signal from the resource demapper 307 to detect each pilot-tone channel, and estimates a timing offset for each user terminal by using the detected pilot-tone channel value. That is, the timing offset is estimated using Equation 7. The detailed construction and operation of the offset estimator 311 will be described later with reference to FIG. 4.

The offset compensator 313 compensates a timing offset of the data signal by using the timing offset value received from the offset estimator 311. The detailed procedure for compensating the timing offset will be described later with reference to FIG. 4.

The equalizer 315 compensates a channel distortion of the data signal by using the channel estimation value received from the channel estimator 309.

The demodulator 317 demodulates the distortion-compensated data signal from the equalizer 315 in a predetermined demodulation scheme to generate a bit stream.

Figure 4:
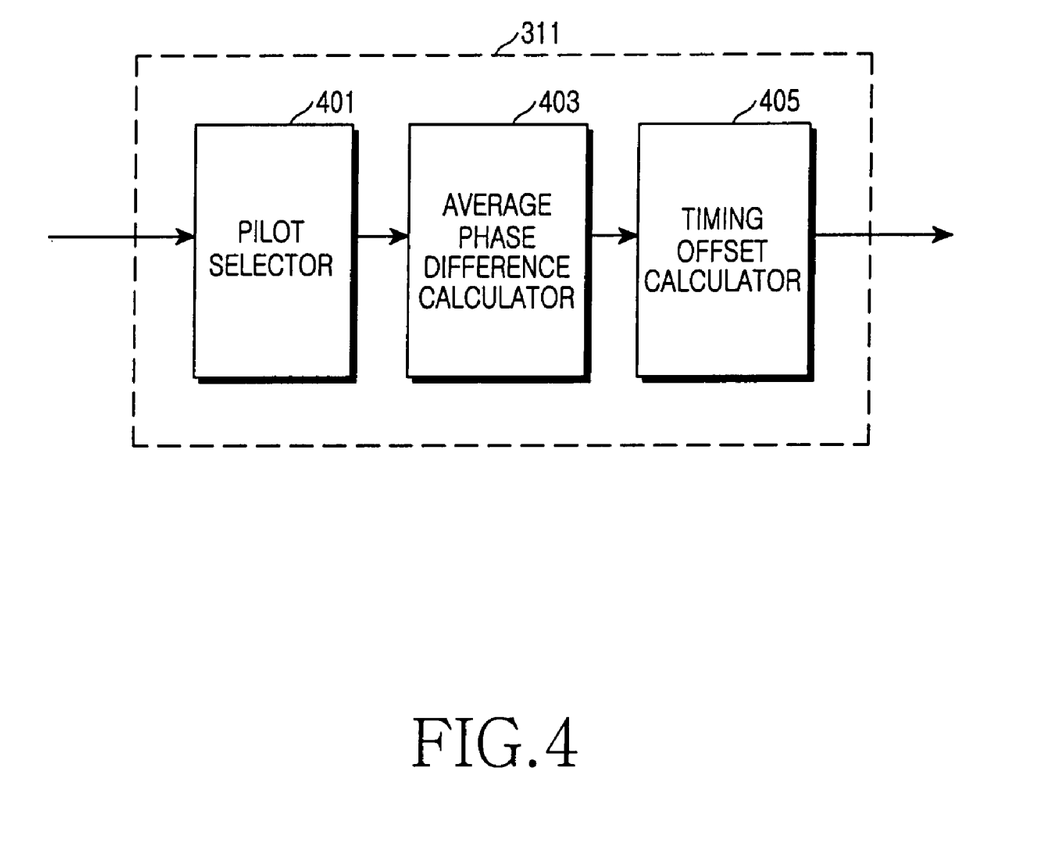
FIG. 4 is a block diagram of an offset estimator of the base station in the broadband wireless communication system according to an embodiment of the present invention.

FIG. 4 is a block diagram of the offset estimator 311 of the base station in the broadband wireless communication system according to an embodiment of the present invention.

Referring to FIG. 4, the offset estimator 311 includes a pilot selector 401, an average phase difference calculator 403, and a timing offset calculator 405.

The pilot selector 401 selects a pilot signal for the timing offset calculation (i.e., a pilot-tone channel value) among the received pilot signals. For example, if a tile is constructed as illustrated in FIGS. 2A and 2B, the pilot selector 401 receives a series of pilot signals $P_0$, $P_1$, $P_2$ and $P_3$ from the resource demapper 307, detects tiles including the respective pilot signals, and pairs the tiles adjacent in terms of time to construct one or more tile pairs. Thereafter, the pilot selector 401 selects pilot pairs $P_0$-$P_3$ and $P_3$-$P_4$ for the timing offset calculation from the tile pairs, and outputs the pilot pairs to the average phase difference calculator 403.

The average phase difference calculator 403 calculates the conjugate products of channel values of the pilot pairs received from the pilot selector 401, and accumulates the conjugate products for all tile pairs in a burst of the corresponding user terminal, thereby calculating the average phase difference. For example, in the case of the FIGS. 2A and 2B tile construction; the average phase difference can be expressed as Equation 8:

$$T, Est_1^A = \tan^{-1}\left(\frac{\text{Im}\left[\sum_{N_{slot-pair}}\sum_{N_{tile}}(P_3^* P_4)\right]}{\text{Re}\left[\sum_{N_{slot-pair}}\sum_{N_{tile}}(P_3^* P_4)\right]}\right) \quad [\text{Eqn. 8}]$$

$$T, Est_2^A = \tan^{-1}\left(\frac{\text{Im}\left[\sum_{N_{slot}}\sum_{N_{tile}}(P_3^* P_0)\right]}{\text{Re}\left[\sum_{N_{slot}}\sum_{N_{tile}}(P_3^* P_0)\right]}\right).$$

In Equation 8, Im( ) denotes an imaginary component, Re( ) denotes a real component, $N_{slot-pair}$ denotes the number of slot pairs consecutive on the time axis, $N_{slot}$ denotes the total slot number, and $N_{tile}$ denotes the total tile number.

Using Equation 8, Equation 7 can be rearranged as Equation 9:

$$2\pi \cdot k_A / N_{FFT} + 2\pi \cdot f_{offset}^A \cdot T_s \frac{1}{3} = \frac{1}{3}T, Est_1^A \quad [\text{Eqn. 9}]$$

$$2\pi \cdot k_A / N_{FFT} - 2\pi \cdot f_{offset}^A \cdot T_s \frac{2}{3} = \frac{1}{3}T, Est_2^A.$$

In Equation 9, $N_{FFT}$ denotes an FFT size, $T,Est_1^A$ and $T,Est_2^A$ denote average phase differences, $f_{offset}^A$ denotes a frequency offset, and $T_s$ denotes an OFDM symbol time.

The timing offset calculator 405 calculates the timing offset by using the average phase difference values received from the average phase difference calculator 403. If a frequency offset is estimated, the timing offset can be calculated as Equation 10 by substituting the estimated frequency offset for the average phase difference expressed as Equation 9.

$$k_A = \frac{\left(\frac{1}{2\pi}\frac{N_{FFT}}{3}T, Est_1 - \frac{T_s N_{FFT}}{3}f_{offset}^A\right) + \left(\frac{1}{2\pi}\frac{N_{FFT}}{3}T, Est_2 + \frac{2T_s N_{FFT}}{3}f_{offset}^A\right)}{2}. \quad [\text{Eqn. 10}]$$

In Equation 10, $N_{FFT}$ denotes an FFT size, $T,Est_1^A$ and $T,Est_2^A$ denote average phase differences, $f_{offset}^A$ denotes a frequency offset, and $T_s$ denotes an OFDM symbol time.

On the other hand, if a frequency offset is not estimated, the timing offset calculator 405 calculates the timing offset by linearly adding the average phase difference values received from the average phase difference calculator 403 to eliminate the frequency offset terms. For example, transposing the constant terms and adding the respective pairs of formulas in Equation 7 results in Equation 11:

$$2T, Est_1^A + T, Est_2^A = 3k_A \cdot \left(2\pi \frac{3}{N_{FFT}}\right). \quad [\text{Eqn. 11}]$$

In Equation 11, $N_{FFT}$ denotes an FFT size and $T,Est_1^A$ and $T,Est_2^A$ denote average phase differences.

Equation 11 can be rearranged for the timing offset $k_A$ as Equation 12:

$$k_A = \frac{N_{FFT}}{18\pi}(2T, Est_1^A + T, Est_2^A). \quad [\text{Eqn. 12}]$$

In Equation 12, $N_{FFT}$ denotes an FFT size and $T,Est_1^A$ and $T,Est_2^A$ denote average phase differences.

That is, the timing offset calculator 405 calculates the timing offset using Equation 10 or Equation 12.

Figure 5:
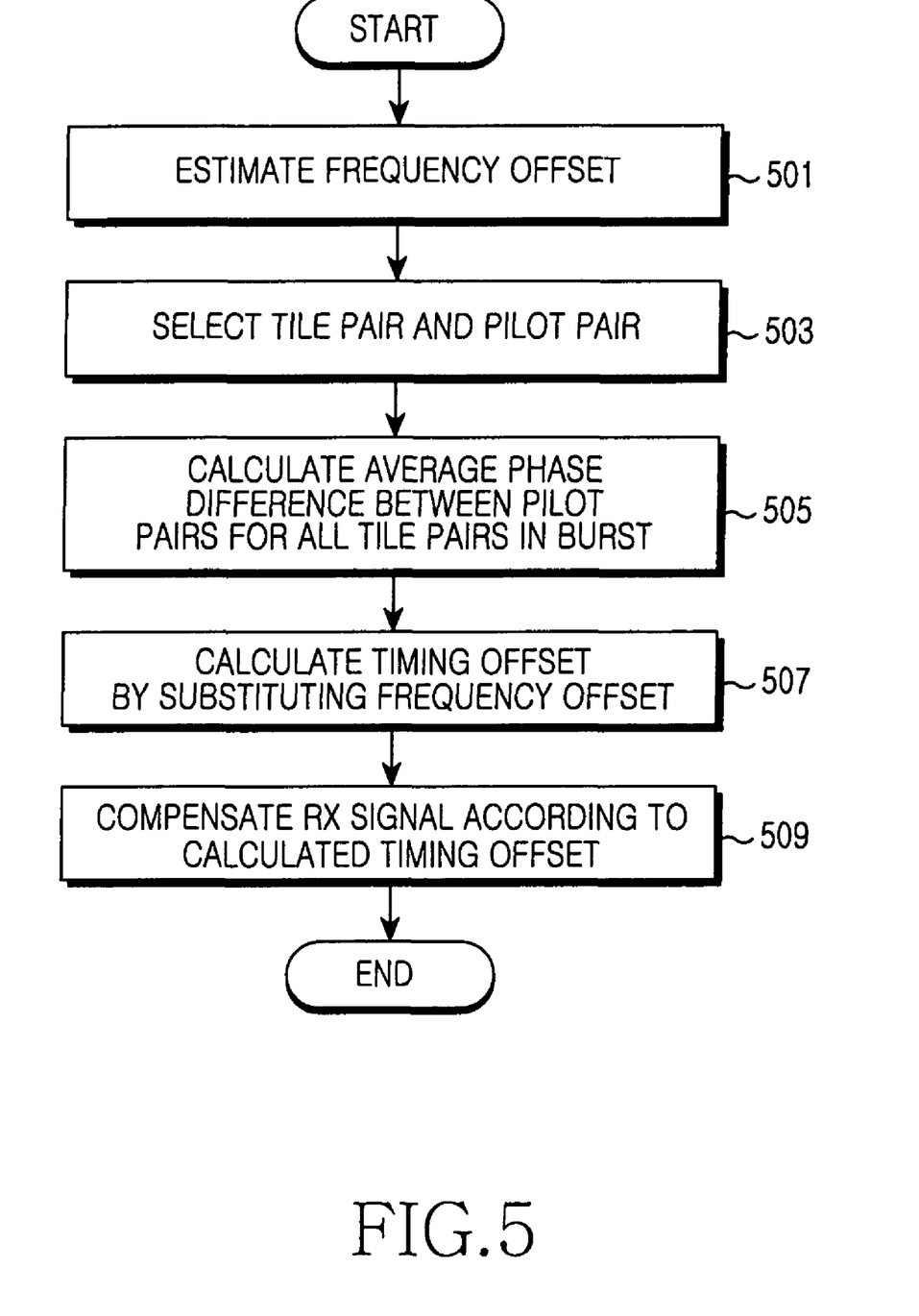
FIG. 5 is a flowchart illustrating a procedure for compensating a timing offset in the broadband wireless communication system according to an embodiment of the present invention.

FIG. 5 is a flowchart illustrating a procedure for compensating the timing offset by the base station in the broadband wireless communication system according to an embodiment of the present invention.

Referring to FIG. 5, the base station estimates a frequency offset in step 501.

In step 503, the base station selects a pair of tiles adjacent in terms of time in a receive (RX) signal, and selects a pilot pair for the timing offset calculation from each tile. Preferably, the most adjacent pilot signals are selected as the pilot pair.

In step 505, the base station calculates an average phase difference between pilot pairs for all tiles in a burst of a user terminal on which the timing offset estimation is to be performed. For example, in the case of the FIGS. 2A and 2B tile construction, the tile pair means two tiles that are adjacent in terms of time, and the average phase difference means an average phase difference between pilot pairs P0-P3 and P3-P4. Also, in the case of the tile constructed as FIGS. 2A and 2B, the average phase difference can be expressed as Equation 8.

In step 507, the base station estimates the timing offset by substituting the frequency offset estimated in step 501. For example, in the case of the tile constructed as FIGS. 2A and 2B, the timing offset can be calculated as Equation 10.

In step 509, the base station compensates a timing offset of the RX signal according to the estimated timing offset. A phase value multiplied by the RX signal for the timing offset compensation can be expressed as Equation 13:

$$\exp(-jm\Delta\theta_i^A) = \exp(-jm(2\pi \cdot k_A/N_{FFT})). \quad [\text{Eqn. 13}]$$

In Equation 13, m denotes a subcarrier index in a tile, $k_A$ denotes a timing offset, and $N_{FFT}$ denotes an FFT size.

Figure 6:
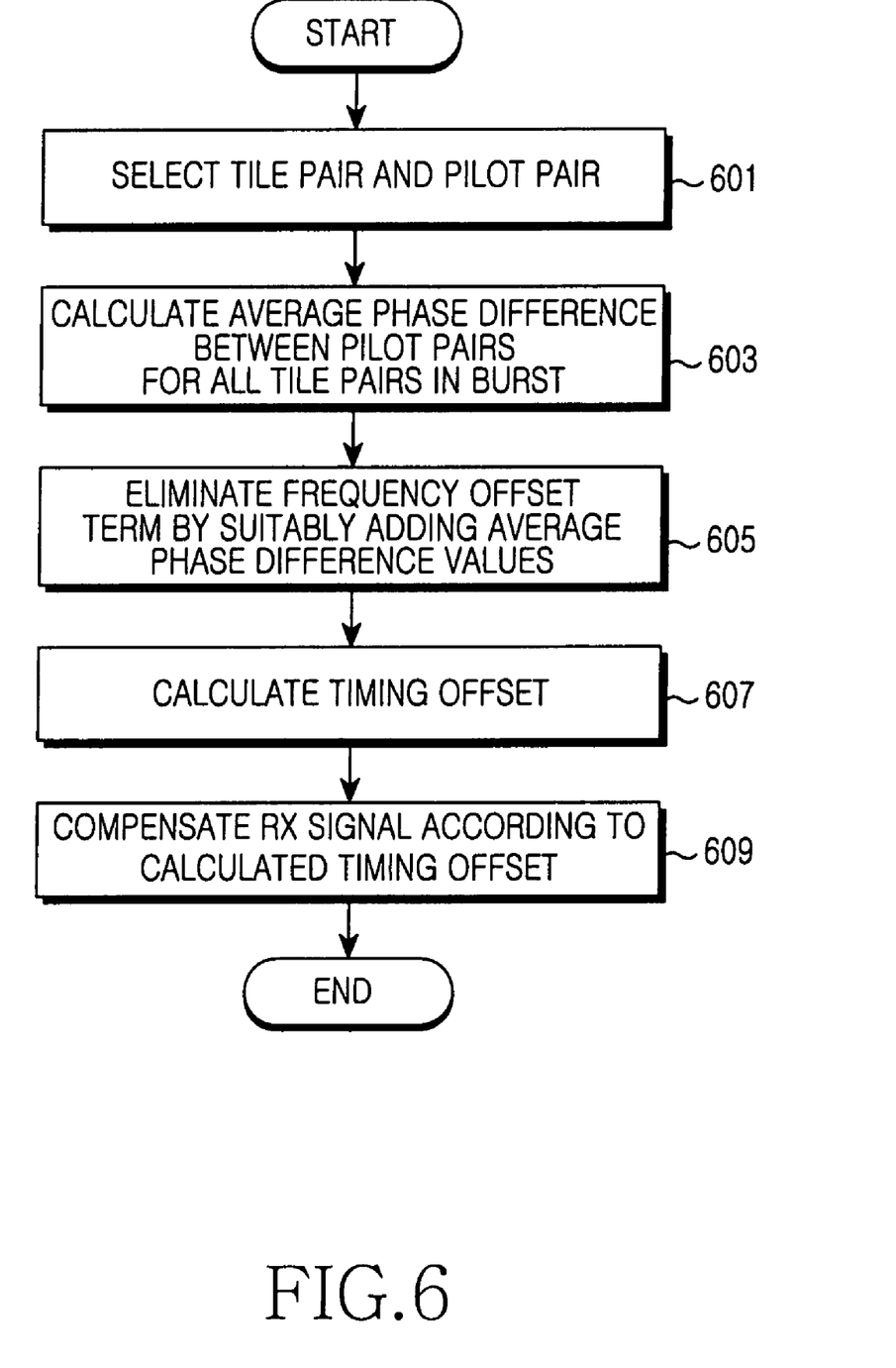
FIG. 6 is a flowchart illustrating a procedure for compensating a timing offset in the broadband wireless communication system according to another embodiment of the present invention.

FIG. 6 is a flowchart illustrating a procedure for compensating the timing offset by the base station in the broadband wireless communication system according to another embodiment of the present invention.

Referring to FIG. 6, in step 601, the base station the base station selects a pair of tiles adjacent in terms of time in a receive (RX) signal, and selects a pilot pair for the timing offset calculation from each tile. Preferably, the most adjacent pilot signals are selected as the pilot pair.

In step 603, the base station calculates an average phase difference between pilot pairs for all tiles in a burst of a user terminal on which the timing offset estimation is to be performed. For example, in the case of the FIGS. 2A and 2B tile construction, the tile pair means two tiles that are adjacent in terms of time, and the average phase difference means an average phase difference between pilot pairs P0-P3 and P3-P4. Also, in the case of the tile constructed as FIGS. 2A and 2B, the average phase difference can be expressed as Equation 8.

In step 605, the base station eliminates frequency offset-related terms by weighting the average phase difference and adding the weighted average phase difference. For example, as Equation 11, the frequency offset-related terms are eliminated by transposing the constant terms and adding the respective pairs of formulas in Equation 7.

In step 607, the base station calculates a timing offset.

In step 609, the base station compensates a timing offset of the receive (RX) signal according to the calculated timing offset. A phase value multiplied by the RX signal for the timing offset compensation can be expressed as Equation 13.

Figure 7A:
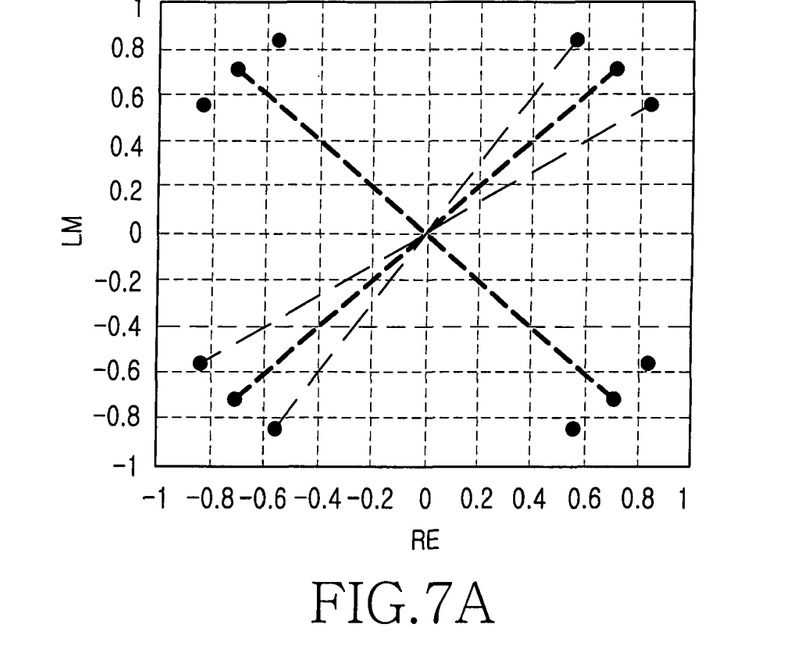
FIGS. 7A and 7B are graphs illustrating a timing offset compensation effect according to the present invention.
Figure 7B:
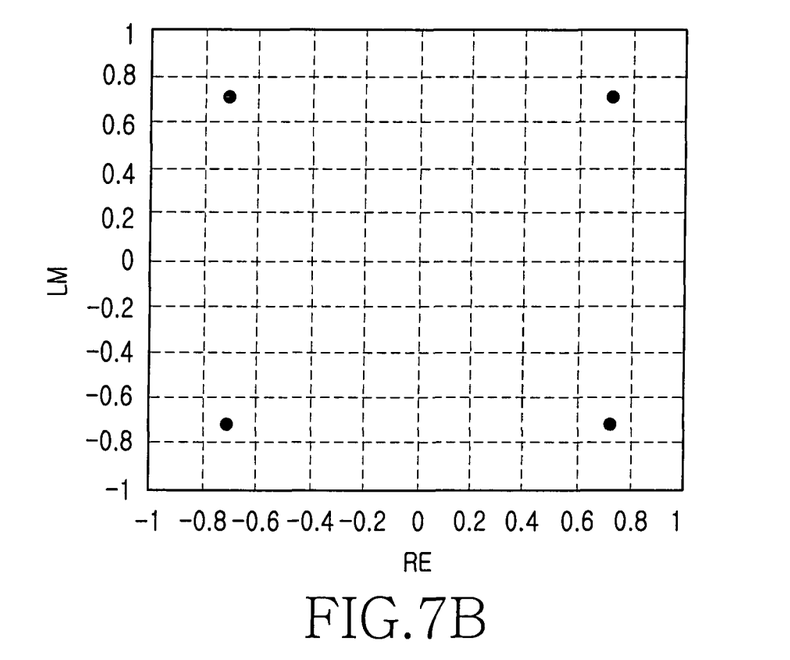

FIGS. 7A and 7B are graphs illustrating the timing offset compensation effects according to the present invention. FIGS. 7A and 7B illustrate a quadrature phase shift keying (QPSK) constellation of an RX signal. In the graphs of FIGS. 7A and 7B, the axis of abscissas is a real axis and the axis of ordinates is an imaginary axis.

FIG. 7A illustrates the constellation before the timing offset compensation. Referring to FIG. 7A, a receive (RX) signal is not accurately located on the constellation, due to a phase distortion caused by the timing offset.

FIG. 7B illustrates the constellation after the timing offset compensation. Referring to FIG. 7B, an RX signal is accurately located on the constellation.

As described above, the present invention estimates and compensates the timing offset by using the pilot tones of consecutive tiles, thereby reducing the phase distortion of the RX signal on the constellation. Thus, transmit (TX) symbols can be detected accurately.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiving apparatus for a wireless communication system, the apparatus comprising:
a selector configured to group two or more adjacent tiles into one or more tile groups and configured to select one or more pilot pairs from each tile group, wherein each pilot pair includes two pilots that belong to different Orthogonal Frequency Division Multiplexing (OFDM) symbols adjacent in the time domain;
a first calculator configured to calculate an average phase difference between two pilot signals in each pilot pair by determining conjugate products of the pilot pairs of each tile group, accumulating the conjugate products in a burst and determining a phase component of the accumulated value as the average phase difference; and
a second calculator configured to calculate a timing offset using the average phase difference,
wherein the average phase difference comprises a timing offset component and a frequency offset component.

2. The receiving apparatus of claim 1, wherein if each of the tiles includes two pilot signals, the selector selects a first pilot signal and a second pilot signal, which are included in the first tile out of the two adjacent tiles, as a first pilot pair, and selects a third pilot signal adjacent to the first tile, which is included in the second tile out of the two adjacent tiles, and the second pilot signal adjacent to the second tile, which is included in the first tile out of the two adjacent tiles, as a second pilot pair.

3. The receiving apparatus of claim 2, wherein the first calculator calculates the average phase difference using the following equation:

$$T, Est_1 = \tan^{-1}\left(\frac{\text{Im}\left[\sum_{N_{slot-pair}} \sum_{N_{tile}} (P_0^* P_1)\right]}{\text{Re}\left[\sum_{N_{slot-pair}} \sum_{N_{tile}} (P_0^* P_1)\right]}\right)$$

$$T, Est_2 = \tan^{-1}\left(\frac{\text{Im}\left[\sum_{N_{slot}} \sum_{N_{tile}} (P_1^* P_2)\right]}{\text{Re}\left[\sum_{N_{slot}} \sum_{N_{tile}} (P_1^* P_2)\right]}\right)$$

where $P_0$ denotes the first pilot signal, $P_1$ denotes the second pilot signal, $P_2$ denotes the third pilot signal, Im( ) denotes an imaginary component, Re( ) denotes a real component, $N_{slot-pair}$ denotes the number of slot pairs, $N_{slot}$ denotes the total slot number, $N_{tile}$ denotes the total tile number, $T,Est_1$ denotes an average phase difference between $P_0$ and $P_1$, and $T,Est_2$ denotes an average phase difference between $P_1$ and $P_2$.

4. The receiving apparatus of claim 3, wherein the second calculator calculates the timing offset using two formulas of the following equation:

$$2\pi \cdot k_A / N_{FFT} + 2\pi \cdot f_{offset} \cdot T_s \frac{1}{3} = \frac{1}{3} T, Est_1$$

$$2\pi \cdot k_A / N_{FFT} - 2\pi \cdot f_{offset} \cdot T_s \frac{2}{3} = \frac{1}{3} T, Est_2$$

where $k_A$ denotes a timing offset, $N_{FFT}$ denotes a Fast Fourier Transform (FFT) size, $f_{offset}$ denotes a frequency offset, $T,Est_1$ denotes an average phase difference between $P_0$ and $P_1$, and $T,Est_2$ denotes an average phase difference between $P_1$ and $P_2$.

5. The receiving apparatus of claim 4, wherein the second calculator calculates the timing offset by substituting an estimated frequency offset in the equation of claim 4.

6. The receiving apparatus of claim 4, wherein the second calculator calculates the timing offset by linearly adding the two formulas of the equation of claim 4 to eliminate the frequency offset terms.

7. The receiving apparatus of claim 1, further comprising a compensator configured to compensate a timing offset of a data signal according to the calculated timing offset.

8. The receiving apparatus of claim 7, wherein the compensator compensates the timing offset of the data signal by multiplying the data signal by a phase value of the following equation:

$$\exp(-jm\Delta\theta_t^A) = \exp(-jm(2\pi \cdot k_A / N_{FFT}))$$

where m denotes a subcarrier index in a tile, $k_A$ denotes a timing offset, and $N_{FFT}$ denotes an FFT size.

9. The receiving apparatus of claim 7, further comprising:
an equalizer configured to compensate a channel distortion of the data signal from the compensator; and
a demodulator configured to demodulate a signal from the equalizer into a bit stream.

10. A method for compensating a timing offset in a broadband wireless communication system, the method comprising:
grouping two or more adjacent tiles into one or more tile groups and selecting one or more pilot pairs, each including adjacent pilot signals, from each tile group, wherein each pilot pair includes two pilots that belong to different Orthogonal Frequency Division Multiplexing (OFDM) symbols adjacent in the time domain;

determining conjugate products of the pilot pairs of each tile group;

accumulating the conjugate products in a burst;

determining a phase component of the accumulated value as the average phase difference; and calculating a timing offset using the average phase difference, wherein the average phase difference comprises a timing offset component and a frequency offset component.

11. The method of claim 10, wherein if each of the tiles includes two pilot signals, selecting the pilot pairs comprises:

selecting a first pilot signal and a second pilot signal, which are included in the first tile out of the two adjacent tiles, as a first pilot pair; and selecting a third pilot signal adjacent to the first tile, which is included in the second tile out of the two adjacent tiles, and a fourth pilot signal adjacent to the second tile, which is included in the first tile out of the two adjacent tiles, as a second pilot pair.

12. The method of claim 11, wherein the average phase difference is calculated using the following equation:

$$T,Est_1 = \tan^{-1}\left(\frac{\text{Im}\left[\sum_{N_{slot-pair}} \sum_{N_{tile}} (P_0^* P_1)\right]}{\text{Re}\left[\sum_{N_{slot-pair}} \sum_{N_{tile}} (P_0^* P_1)\right]}\right)$$

$$T,Est_2 = \tan^{-1}\left(\frac{\text{Im}\left[\sum_{N_{slot}} \sum_{N_{tile}} (P_1^* P_2)\right]}{\text{Re}\left[\sum_{N_{slot}} \sum_{N_{tile}} (P_1^* P_2)\right]}\right)$$

where $P_0$ denotes the first pilot signal, $P_1$ denotes the second pilot signal, $P_2$ denotes the third pilot signal, Im( ) denotes an imaginary component, Re( ) denotes a real component, $N_{slot-pair}$ denotes the number of slot pairs, $N_{slot}$ denotes the total slot number, $N_{tile}$ denotes the total tile number, $T,Est_1$ denotes an average phase difference between $P_0$ and $P_0$, and $T,Est_2$ denotes an average phase difference between $P_1$ and $P_2$.

13. The method of claim 12, wherein the timing offset is calculated using two formulas of the following equation:

$$2\pi \cdot k_A / N_{FFT} + 2\pi \cdot f_{offset} \cdot T_s \frac{1}{3} = \frac{1}{3} T, Est_1$$

$$2\pi \cdot k_A / N_{FFT} - 2\pi \cdot f_{offset} \cdot T_s \frac{2}{3} = \frac{1}{3} T, Est_2$$

where $k_A$ denotes a timing offset, $N_{FFT}$ denotes a Fast Fourier Transform (FFT) size, $f_{offset}$ denotes a frequency offset, $T,Est_1$ denotes an average phase difference between $P_0$ and $P_1$, and $T,Est_2$ denotes an average phase difference between $P_1$ and $P_2$.

14. The method of claim 13, wherein the timing offset is calculated by substituting an estimated frequency offset in the equation of claim 13.

15. The method of claim 13, wherein the timing offset is calculated by linearly adding the two formulas of the equation of claim 13 to eliminate the frequency offset terms.

16. The method of claim 10, further comprising compensating a timing offset of a data signal according to the calculated timing offset.

17. The method of claim 16, wherein the timing offset of the data signal is compensated by multiplying the data signal by a phase value of the following equation:

$$\exp(-jm\Delta\theta_i^A) = \exp(-jm(2\pi \cdot k_A/N_{FFT}))$$

where m denotes a subcarrier index in a tile, $k_A$ denotes a timing offset, and $N_{FFT}$ denotes an FFT size.

18. The method of claim 16, further comprising:

compensating a channel distortion of the timing offset-compensated signal; and demodulating the channel distortion-compensated signal into a bit stream.

* * * * *